United States Patent
Sheng

(10) Patent No.: US 9,584,698 B2
(45) Date of Patent: Feb. 28, 2017

(54) PRINTING DEVICE FOR PROVIDING MULTIPLE DOCUMENTS OF ONE TYPE

(71) Applicant: Avision Inc., Hsinchu (TW)

(72) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/987,591

(22) Filed: Jan. 4, 2016

(65) Prior Publication Data

US 2016/0198067 A1  Jul. 7, 2016

(30) Foreign Application Priority Data

Jan. 6, 2015 (TW) .............................. 104100242 A

(51) Int. Cl.
*H04N 1/405* (2006.01)
*G06F 3/12* (2006.01)

(52) U.S. Cl.
CPC ......... *H04N 1/4057* (2013.01); *G06F 3/1215* (2013.01); *G06F 3/1219* (2013.01); *H04N 1/40018* (2013.01)

(58) Field of Classification Search
CPC . H04N 1/32352; H04N 1/3232; G06F 3/1243
See application file for complete search history.

(56) References Cited

U.S. PATENT DOCUMENTS

| | | | | |
|---|---|---|---|---|
| 3,561,754 A | * | 2/1971 | Gaffron | G03G 15/6538 270/58.18 |
| 4,998,131 A | * | 3/1991 | Ueda | G03B 27/32 355/100 |
| 5,568,248 A | * | 10/1996 | Wagley | G03G 13/22 399/156 |
| 2007/0211278 A1 | * | 9/2007 | Saito | G06F 3/1284 358/1.14 |
| 2008/0030816 A1 | * | 2/2008 | Jang | H04N 1/40012 358/530 |
| 2011/0026076 A1 | * | 2/2011 | Sawano | G06F 3/1208 358/1.15 |

(Continued)

FOREIGN PATENT DOCUMENTS

| | | |
|---|---|---|
| CN | 101453545 A | 6/2009 |
| TW | 200849967 | 12/2008 |

*Primary Examiner* — Stephen Meier
*Assistant Examiner* — Sharon A Polk

(57) ABSTRACT

A printing device for providing multiple documents of one type includes a data receiving portion for receiving an image data, a processor, and a printing module. The processor is used to process the image data to generate a first printing information and a second printing information. The printing module is used to print a first document and a second document according to the first and second printing information, respectively. The first printing information includes the image data and a first identifying information, and the second printing information includes the image data and a second identifying information different from the first identifying information. The first identifying information is composed of a first set of halftone pattern, a first set of lines or a combining information thereof. The second identifying information is composed of a second set of halftone pattern, a second set of lines or a combining information thereof.

9 Claims, 2 Drawing Sheets

(56) References Cited

U.S. PATENT DOCUMENTS

2012/0121122 A1* 5/2012 Murakami ............ G06T 1/0028
382/100
2012/0246559 A1* 9/2012 DeRoller .............. G06F 3/1211
715/239

* cited by examiner

PRINTING DEVICE FOR PROVIDING MULTIPLE DOCUMENTS OF ONE TYPE

The current application claims a foreign priority to application number 104100242 filed on Jan. 6, 2015 in Taiwan.

BACKGROUND OF THE INVENTION

Field of the Invention

The present invention relates to a printing device, and more particularly, the present invention relates to a printing device for providing multiple documents of one type.

Description of Related Art

The conventional triplicate form is composed by carbon papers having different colors, and be printed information on the first sheet by a dot matrix type printer so as to duplicate the same information on the second and third sheets. However, the conventional triplicate form needs to be customized specially, and have higher cost. Wherein, the average cost of each triplicate form is about 0.78 NTD, and the ribbon of the dot matrix type printer must be replaced in use. Takes an example of a triplicate form which can be printed about 400 words, one ribbon can supply about 20000 triplicate forms for printing. The average printing cost of each triplicate form is about 0.02 NTD. Therefore, the total printing cost of the triplicate form is about 0.8 NTD.

In addition, the conventional dot matrix type printer has slow speed, noisy, and crooked or unclear print. Besides, the thickness of the triplicate form is thicker, which causes jams easily or can't feed smoothly. Thus, the problems about paper damage and reprinting requirement are occurred. Furthermore, the printed triplicate form needs to be separated for dispensing to all required units, and be with poor efficiency.

SUMMARY OF THE INVENTION

Accordingly, an object of the present invention is to provide a printing device for replacing the conventional dot matrix type printer. Thus, the conventional triplicate form and the special ribbon are not required, so that the cost of consumable can be reduced.

To achieve the foregoing and other objects, a printing device for providing multiple documents of one type is provided. The printing device comprises a data receiving portion, a processor, and a printing module. The data receiving portion is used for receiving an image data. The processor is used to process the image data to generate a first printing information and a second printing information. The printing module is used to print a first document and a second document respectively according to the first printing information and the second printing information. The first printing information includes image data and a first identifying information; the second printing information includes the image data and a second identifying information different from the first identifying information. The first identifying information is composed of a first set of halftone pattern, a first set of lines, or a combining information thereof, and the second identifying information is composed of a second set of halftone pattern, a second set of lines, or a combining information thereof.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

In a embodiment of the present invention, a printing device is provided, such as a laser printer or LED printer. Wherein, the laser printer or the LED printer can replace the dot matrix type printer specialized for the triplicate form. The laser printer or the LED printer uses A4 papers or other size papers to print. Wherein, the print of three documents of one type needs three sheets of paper, which cost is about 0.36 NTD. The toner printing cost of three documents of one type is about 0.4 NTD. Thus, the consumable cost of the laser printer or the LED printer for printing three documents of one type just needs about 0.76 NTD.

With respect to the dot matrix type printer, the laser printer or the LED printer has faster printing speed, less noise, and be without crooked or unclear print easily. In addition, the thickness of the papers used in the present invention is thinner, which can cause paper feeding smoothly without jams. Besides, papers used in the present invention are not needed to be customized additionally. Wherein, the printed papers can be separated by the auto-distributing paper device without manual operation. Thus, the efficiency of the present invention is preferred.

Preferred embodiments are disclosed below for elaborating upon the invention only and not as a limitation upon the scope of the invention.

Figure 1:
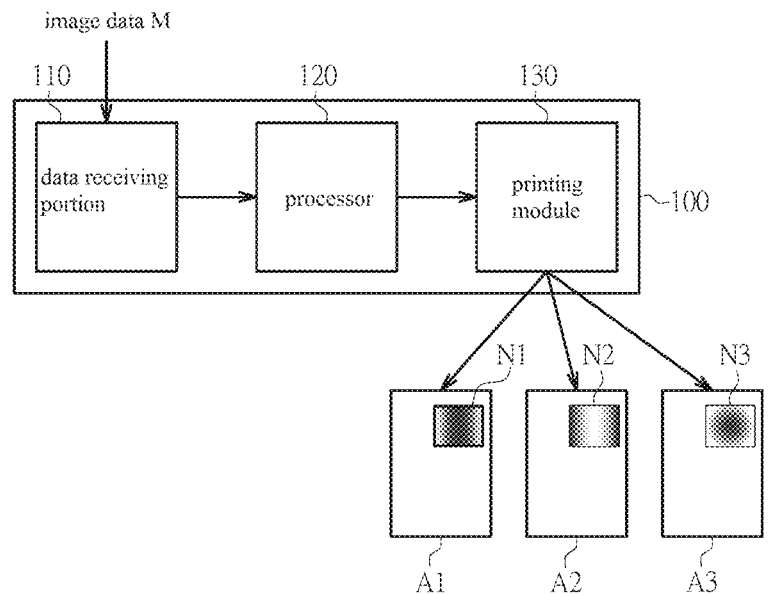
FIG. 1 is a block diagram showing a printing device according to one embodiment of the present invention.

Referring to FIG. 1, FIG. 1 is a block diagram showing a printing device 100 according to one embodiment of the present invention. The printing device 100 comprises a data receiving portion 110, a processor 120, and a printing module 130. The data receiving portion 110 is sequentially connected to the processor 120 and the printing module 130. The data receiving portion 110 is used for receiving an image data M and outputting to the processor 120 via an outputting terminal. The image data M can be transported to the printing device 100 via the network cable or the USB signal line, or can be transported to the printing device 100 via Wi-Fi wireless signals or blue-tooth wireless signals. The image data M also can be scanned by the scanning device which connects to or hides in the printing device 100, and then the image data M can be transported to the data receiving portion 110. The image data M includes text information and/or form information . . . etc. With respect to the dot matrix type printer, the present invention does not need to be customized the papers with special forms additionally. Wherein, in the present invention, the forms can be generated directly from the storage form information built in the processor 120, or the image data M contains the form information itself.

The processor 120 is electrically connected to the data receiving portion 110, and can process the image data M to generate a printing information, such as a first printing information and a second printing information. In addition, the printing module 130 can print a first document A1 and a second document A2 respectively according to the first printing information and the second printing information. The first document A1 and the second document A2 are composed of two documents of one type having the same printing information.

In one embodiment, the processor 120 is, for example, a application-specific integrated circuit (ASIC), and the printing module 130 is, for example, a monochrome laser printing module or a monochromatic light emitting diodes printing module. Worth mention, in the conventional triplicate form, the three documents with the same printing information are distinguished by the background color of each document. However, in the present invention, the first document A1 and second document A2 are all monochrome documents with the same color, such as A4 blank paper. This is, the documents of the present invention do not need to be distinguished by the background color of each document. Thus, in order to distinguish the printed first document A1 and the printed second document A2 conveniently, the printing module 130 prints the first document A1 according to the first print data with the image data M and a first identifying information N1, and prints the second document A2 according to the second print data with the same image data M and a second identifying information N2 different from the first identifying information N1. The first identifying information N1 and the second identifying information N2 can be monochromatic images which corresponding to different background colors respectively. Therefore, the present invention can replace the two colors information of dot matrix type carbon paper.

In addition, the processor 120 further can process the image data M to generate a third printing information, and the printing module 130 can print a third document A3 according to the third printing information including the same image data M and a third identifying information N3. The third identifying information N3 is different from the first identifying information N1 and the second identifying information N2. The first document A1, the second document A2, and the third document A3 can be composed of three documents of one type having the same printing information, such as a triplicate form. Likewise, the present invention does not limit the multiple documents of one type having the same printing information, such as two documents of one type, three documents of one type, four documents of one type, or five documents of one type . . . etc.

Figures 2A, 2B, 2C:
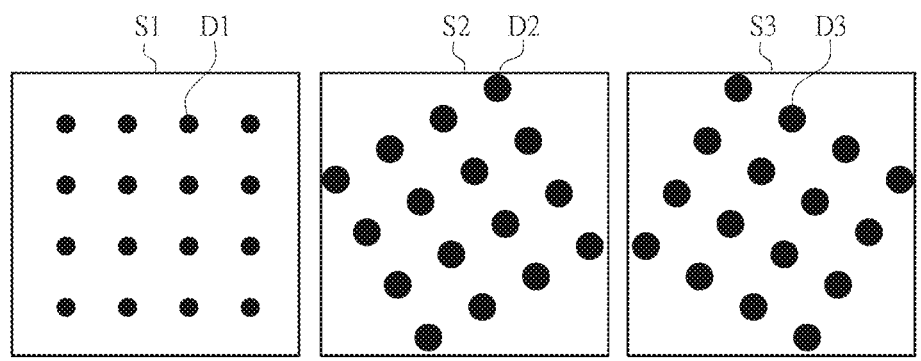
FIGS. 2A-2C show different aspects of the dot pattern.

The first identifying information N1, the second identifying information N2, and the third identifying information N3 includes, for example, multiple dot patterns with different densities and/or different sizes. Referring to FIGS. 2A-2C, a first set of pattern S1 includes dots D1 arranged in a first rectangular array, which have an disposing angle of 0° relative to the horizontal direction. A second set of pattern S2 includes dots D2 arranged in a second rectangular array, which have an disposing angle of 30° relative to the horizontal direction. A third set of pattern S3 includes dots D3 arranged in a third rectangular array, which have an disposing angle of 75° relative to the horizontal direction. The dots of the three sets have different sizes and densities, wherein the present invent does not limit one set of pattern to be with the same size and density of dots.

The colored dots adjusted by the above method of coloring or non-coloring to have different densities or different sizes are called as a halftone pattern. Wherein, the halftone pattern can generated a gray level variation in visual, to make eyes have different visual effect for the same image. The halftone pattern is generally formed by the technology of order dithering and error diffusion. Wherein, the order dithering technology uses a digital method to simulate the contact screening process applied in stencil printing, and each pixel value of the formed halftone pattern depends on the pixel tone; Error diffusion technology is used to operate other pixels surrounding the processing pixel of the continuous tone image for obtaining the pixel value of the halftone pattern. In one embodiment, the first set of halftone pattern, the second set of halftone pattern, and the third set of halftone pattern formed by the forgoing dots D1-D3 can be as the first identifying information N1, the second identifying information N2, and the third identifying information N3.

Figures 3A, 3B, 3C:
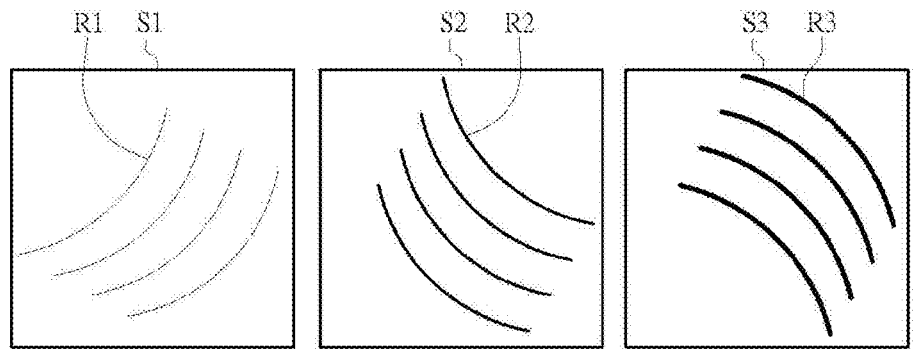
FIGS. 3A-3C show different aspects of the line pattern.

Except the halftone pattern, the first identifying information N1, the second identifying information N2, and the third identifying information N3 also can includes multiple parallel lines with different extending directions and/or different thickness degree. Referring to FIGS. 3A-3C, the first set of pattern S1 includes a first set of parallel lines R1 curved downward from top right to lower left. The second set of pattern S2 includes a second set of parallel lines R2 curved downward from top left to lower right. The third set of pattern S3 includes a third set of parallel lines R3 curved upward from top left to lower right. The thickness degree of the three sets of lines are different, wherein the present invent does not limit one set of pattern just to have the same thickness degree of lines. In the present embodiment, the first identifying information N1, the second identifying information N2, and the third identifying information N3 can be as the first set of lines, the second set of lines and, the third set of lines respectively.

In another embodiment (not shown), the overlapping of the first set of lines and the second set of lines can be as the first identifying information N1, the overlapping of the second set of lines and the third set of lines can be as the second identifying information N2, and the overlapping of the third set of lines and the first set of lines can be as the third identifying information N3. Thus, the present embodiment does not limit just one set of lines to be as the identifying information.

In addition, in another embodiment (not shown), at least three combinations composed of one set of the forgoing halftone patterns and one set of the forgoing lines can be as the first identifying information N1, the second identifying information N2, and the third identifying information N3. Thus, the embodiments of the present invention can implement independently, and the present invention is not limited to.

Figure 4:
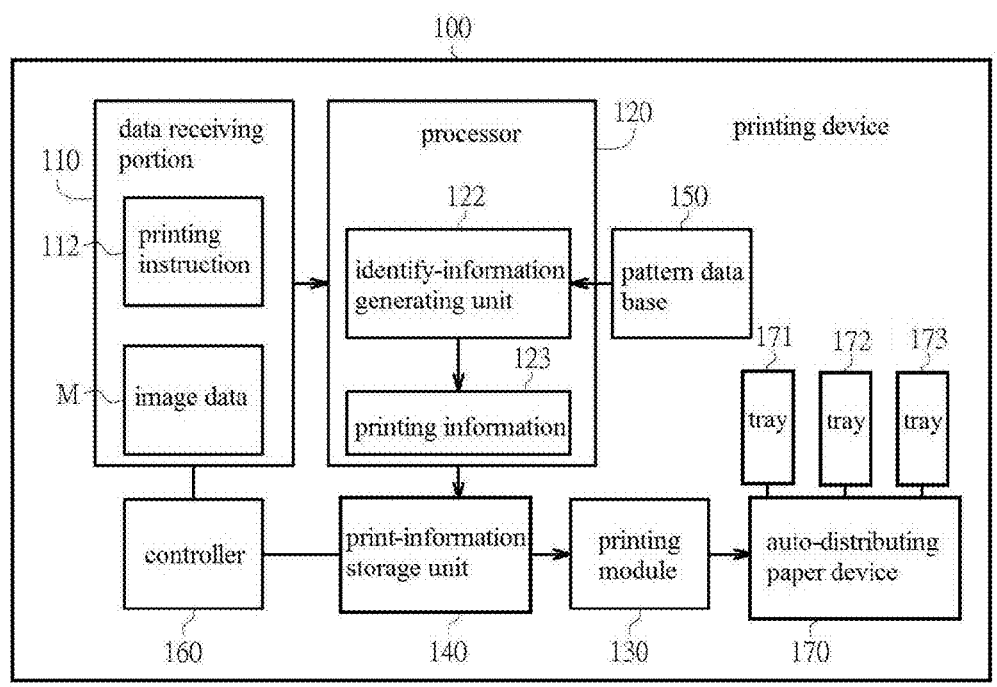
FIG. 4 is a block diagram showing a printing device according to the one embodiment of the present invention.

Referring to FIG. 4, FIG. 4 is a block diagram showing a printing device 100 according to the one embodiment of the present invention. Except comprising the data receiving portion 110, the processor 120, and the printing module 130, the printing device 100 further comprises a print-information storage unit 140, a pattern data base 150, a controller 160, and a auto-distributing paper device 170. The controller 160 is used for controlling the data receiving portion 110 to receive a printing instruction 112 and an image data M. The printing instruction 112 includes the printing format and the printing amount, wherein the printing instruction 112 can be executed to print the image data M by the way of normal mode or multiple documents of one type. The pattern data base 150 is used to store data of the first set of pattern, the second set of pattern, and the third set of pattern. The first set of pattern, the second set of pattern, and the third set of pattern can be formed by a identify-information generating unit 122 according to the data of the pattern data base 150. When the processor 120 receives a instruction of printing multiple documents of one type, the image data M is processed by the processor 120 to combine the image data M and the pattern formed by the identify-information generating unit 122, and then a printing information 123 can be generated. Then, the printing information 123 can be transported to the print-information storage unit 140 for printing. The controller 160 can control the printing module 130 to print multiple documents of one type sequentially. Next, the controller 160 further can control the auto-distributing paper device 170 to dispense multiple documents with different identifying information to the corresponding tray 171 to 173. Thus, the papers of the present invention does not need to be separate in manual operation.

In the above embodiment of the present invention, the printing device can print multiple documents of one type, which can replace the conventional dot matrix type printer, and does not need to use the conventional triplicate form and special ribbon. Thus, the consumable cost can be reduced. In addition, the printing device of the present invention can solve the problem that the conventional dot matrix type printer just can use the special triplicate form, and solve the problem of crooked or unclear print. Besides, the printing device of the present invention also can solve the problem of paper damage and reprinting requirement due to the thickness of the conventional triplicate form is thicker which causes jams easily or can't feed smoothly.

While the disclosure has been described by way of example and in terms of the preferred embodiments, it is to be understood that the disclosure is not limited to the disclosed embodiments. To the contrary, it is intended to cover various modifications and the same arrangements (as would be apparent to those skilled in the art). Therefore, the scope of the appended claims should be accorded the broadest interpretation so as to encompass all such modifications and the same arrangements.

What is claimed is:

1. A printing device for providing multiple documents of one type, the printing device comprising:
   a scanning device for receiving an image data;
   a processor used to process the image data to generate a first printing information and a second printing information; and
   a optics printer used to print a first document and a second document respectively according to the first printing information and the second printing information;
   wherein, the first printing information includes the image data and a first identifying information; the second printing information includes the image data and a second identifying information different from the first identifying information;
   wherein, the first identifying information is composed of a first set of halftone pattern, a first set of lines, or a combining information thereof, the second identifying information is composed of a second set of halftone pattern, a second set of lines, or a combining information wherein, the first document is printed with the image data in a first printed region and the first identifying information is printed in a second printed region, and the second document is printed with the image data in a first printed region and the second identifying information is printed in a second printed region;
   wherein, the first printed region of the image data on the first document is spaced from the second printed region of the first identifying information on the first document, and the first printed region of the image data on the second document is spaced from the second printed region of the second identifying information on the second document.

2. The printing device of claim 1, wherein the optics printer is a monochrome laser printing module or a monochromatic light emitting diodes printing module.

3. The printing device of claim 1, wherein the first identifying information and the second identifying information are monochromatic images corresponding to different background colors respectively.

4. The printing device of claim 1, wherein the first set of halftone pattern and the second set of halftone pattern are composed of multiple dot patterns with different densities and/or different sizes.

5. The printing device of claim 1, wherein the first set of lines and the second set of lines are composed of multiple parallel lines with different extending directions and/or different thickness.

6. The printing device of claim 1, wherein the processor further processes the image data to generate a third printing information, the optics printer prints a third document according to the third printing information; the third printing information includes the image data and a third identifying information different from the first identifying information and the second identifying information;
   wherein, the third identifying information is composed of a third set of halftone pattern, a third set of lines, or a combining information thereof.

7. The printing device of claim 6, wherein the first set of halftone pattern, the second set of halftone pattern, and the third set of halftone pattern are composed of multiple dot patterns with different densities and/or different sizes.

8. The printing device of claim 6, wherein the first set of lines, the second set of lines, and the third set of lines are composed of multiple parallel lines with different extending directions and/or different thickness.

9. The printing device of claim 1, comprise a auto-distributing paper device and multiple trays, the documents with different identifying information are dispensed to the trays by the auto-distributing paper device sequentially.

* * * * *